W. E. LOUCKS.
DECKING AND HOLDING DEVICE FOR TRANSPORTING VEHICLES.
APPLICATION FILED OCT. 31, 1921.
Patented Oct. 10, 1922.
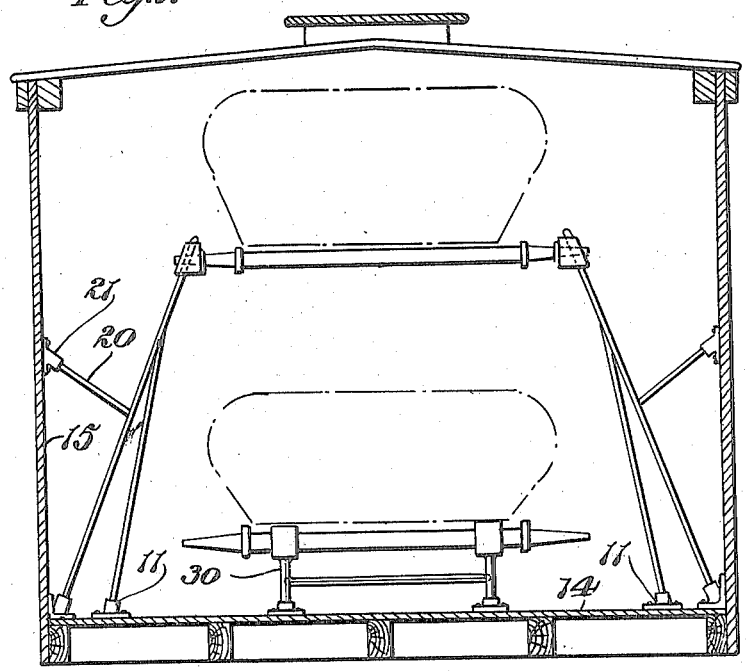
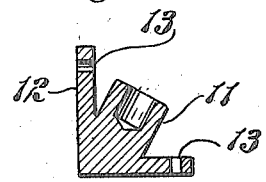
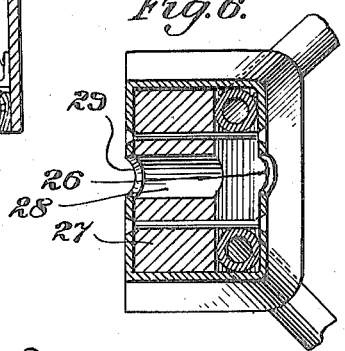
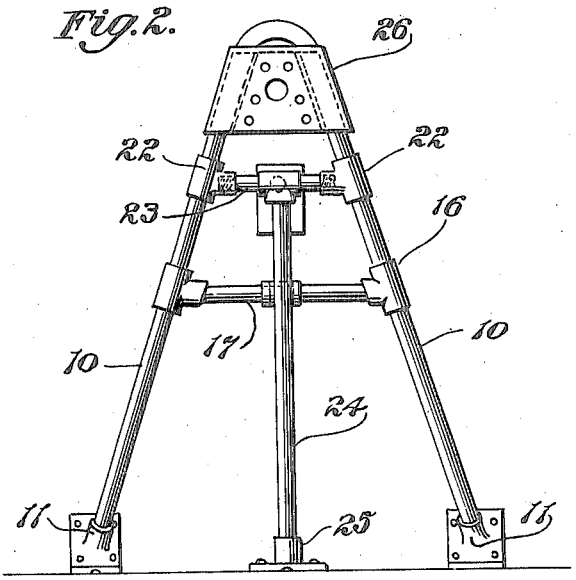
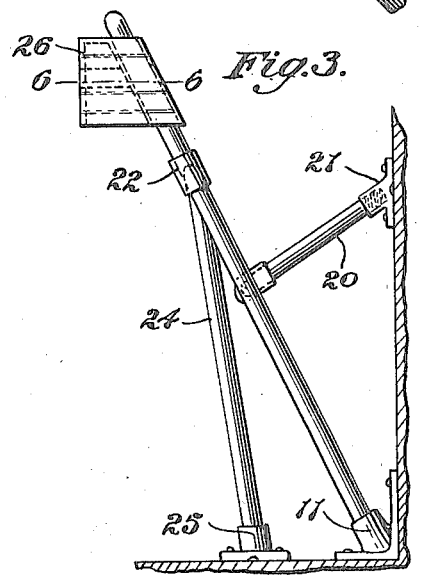
Inventor:
Walter E. Loucks.

Patented Oct. 10, 1922.

1,431,531

UNITED STATES PATENT OFFICE.

WALTER E. LOUCKS, OF SOUTH PASADENA, CALIFORNIA.

DECKING AND HOLDING DEVICE FOR TRANSPORTING VEHICLES.

Application filed October 31, 1921. Serial No. 511,585.

*To all whom it may concern:*

Be it known that I, WALTER E. LOUCKS, a citizen of the United States, residing at South Pasadena, in the county of Los Angeles and State of California, have invented new and useful Improvements in Decking and Holding Devices for Transporting Vehicles, of which the following is a specification.

My invention relates to a decking and holding device for vehicles that are being transported in cars or ships, the principal objects of my invention being to provide a relatively simple and practical apparatus that will be effective in economizing space in the transportation of vehicles; to provide a strong and substantial structure that may be advantageously used for supporting vehicle bodies in elevated position within a carrier, such as a freight car, thereby permitting a second vehicle body to be placed adjacent to the floor of the car below the elevated vehicle body; and, further, to provide a vehicle holding and supporting device that is of strong and substantial structure and capable of being easily and cheaply produced.

With the foregoing and other objects in view, my invention consists of the features of construction and combination and arrangement of parts hereinafter more fully described and claimed, reference being had to the accompanying drawings, wherein:

Figure 1 is a cross sectional view of a freight car, showing a decking and holding device of my improved construction positioned therein;

Figure 2 is a side elevation view of one of the decking and holding devices contemplated by my invention;

Figure 3 is an elevation view taken at right angles to Figure 2;

Figure 4 is a sectional view of one of the base blocks or anchoring members forming a part of my improved decking and holding device;

Figure 5 is an elevational view of a swivel connection for the side brace of my improved decking and holding device;

Figure 6 is an enlarged horizontal section taken approximately on the line 6—6 of Figure 3.

In the construction of my improved decking and holding device, the main member of the frame is preferably formed from a single piece of tubular material that is bent at its center so as to form an inverted V-shaped structure comprising a pair of inclined legs 10 and the lower ends thereof are fixed in any suitable manner in socket members 11 that are formed integral with angle blocks 12, the latter being provided at suitable points with apertures 13. When the frame is installed in a freight car, these blocks 12 are positioned in the corner between the floor 14 of the car and the side wall 15 thereof, and said blocks are firmly secured to the car parts by bolts or like fastening devices that pass through the apertures 13.

Secured to the intermediate portions of the legs 10 are T-connections 16 and seated in the horizontally disposed portions thereof is a horizontally disposed brace member 17, preferably metal tubing. Arranged on the intermediate portion of this horizontal member 17 and secured thereto in any suitable manner is a pair of spaced collars 18 and loosely arranged on the brace member between said collars is a sleeve 19 to which is fixed in any suitable manner the inner end of an outwardly and upwardly projecting brace member 20, preferably a metal tube, the outer end of which is threadedly connected to a block 21 which latter may be secured to the side wall 15 of the car body. By swiveling the inner end of the brace member 20 to the brace 17, the outer upper end of the brace member 20 may be raised or lowered before the block 21 is fixed to the wall of the car body, and as a result the angular position of the inverted V-shaped frame comprising the legs 10 may be adjusted toward or away from the center of the car.

Fixed in any suitable manner to the upper portions of the legs 10 and at points a short distance above the connections 16 are T-connections 22, and secured to the horizontally disposed portions thereof is a horizontally disposed brace member 23. Secured to the intermediate portion of this brace member is the upper end of a tubular leg or brace member 24, the lower end of which is seated in a block 25 which latter is adapted to be secured to the floor 14 of the car at a point between the blocks 12 and spaced a short distance away from the side wall of the car.

Positioned on the upper end of the inverted V-shaped frame member comprising the legs 10 is a metal housing 26 within which is positioned a block 27 preferably of wood, and said block is provided with a transversely disposed aperture 28 that coincides with corresponding apertures 29 that are formed in the inner and outer walls of housing 26. The aperture 28 in the wooden block 27 is adapted to receive and serve as a bearing for the spindle of the vehicle axle, and by the use of a supporting member of wood the spindle will not be injured during transportation.

Decking frames of my improved construction may be easily and quickly placed in position in a freight car or the like, and when properly positioned and the spindles on the ends of the axles of a vehicle are positioned in the blocks 27, the body of the vehicle will be firmly retained in an elevated position within the car body and ample space is provided beneath the supported body for a second body, which latter may be engaged and retained on similar low supports 30 that are positioned on the car floor.

Inasmuch as all of the principal members of my improved frame are formed of metal tubing, the completed structure is relatively light in weight and at the same time possessed of the necessary strength and stability to carry the weight of the supported vehicle body. The frames may be readily placed in position and secured to the car body when loading a car with vehicles, and when the car has reached its destination the frame members may be readily detached and removed from the car body. The swiveled brace members 20 permit the upright frames to be adjusted toward or away from the center of the car and said swiveled braces when properly anchored to the side walls of the car body are effective in retaining the supporting frames against any lateral thrusts and strains that may be developed while the car is in transit.

In some instances, and particularly where the vehicle bodies are relatively light in weight, the intermediate brace members 24 may be dispensed with.

Thus it will be seen that I have provided a decking and holding device that is of relatively simple, strong and substantial structure, which may be advantageously used for firmly holding the vehicle bodies in elevated positions within a car body or the like, thereby enabling the space in the lower portion of the car body to be utilized for receiving vehicle bodies or the like and, consequently, effecting a material saving of time, labor and expense in the storage and transportation of vehicle bodies.

It will be understood that minor changes in the size, form and construction of the various parts of my improved decking and holding device may be made and substituted for those herein shown and described without departing from the spirit of my invention, the scope of which is set forth in the appended claims.

I claim as my invention:

1. In a decking and holding device for transporting vehicles, a frame including an inverted V-shaped member formed from a continuous piece of metal tubing, means for securing the lower ends of the legs of said frame to a carrier and a member arranged at the upper end of said inverted V-shaped frame for receiving the spindle on the axle of the supported vehicle.

2. In a decking and holding device for transporting vehicles, a frame including an inverted V-shaped member formed from a continuous piece of metal tubing, means for securing the lower ends of the legs of said frame to a carrier, a member arranged at the upper end of said inverted V-shaped frame for receiving the spindle on the axle of the supported vehicle, and an intermediate brace member extending from the upper portion of the inverted V-shaped frame downwardly to the floor of the carrier.

3. In a decking and holding device for transporting vehicles, a frame including an inverted V-shaped member formed from a continuous piece of metal tubing, means for securing the lower ends of the legs of said frame to a carrier, a member arranged at the upper end of said inverted V-shaped frame for receiving the spindle on the axle of the supporting vehicle, a brace member between the intermediate portion of said inverted V-shaped frame and the side of the carrier, and an intermediate brace member extending from the upper portion of the inverted V-shaped frame downwardly to the floor of the carrier.

4. In a decking and holding device for transporting vehicles, an inverted V-shaped frame member composed of metal tubing, a spindle receiving block on the upper end of said inverted V-shaped member, and a brace member pivotally connected to the intermediate portion of said inverted V-shaped member and extending upwardly and outwardly therefrom.

5. In a decking and holding device for transporting vehicles, an inverted V-shaped frame member composed of metal tubing, a spindle receiving block on the upper end of said inverted V-shaped member, a brace member pivotally connected to the intermediate portion of said inverted V-shaped member and extending upwardly and outwardly therefrom, and an anchoring block threadedly mounted on the outer end of the adjustable members.

In testimony whereof I have signed my name to this specification.

WALTER E. LOUCKS.